United States Patent
Shirakawa et al.

(10) Patent No.: US 6,804,240 B1
(45) Date of Patent: Oct. 12, 2004

(54) FAST AND ADAPTIVE PACKET PROCESSING DEVICE AND METHOD USING DIGEST INFORMATION OF INPUT PACKET

(75) Inventors: Kenji Shirakawa, Kanagawa (JP);
Yasuro Shobatake, Kanagawa (JP);
Toshio Okamoto, Tokyo (JP);
Yoshimitsu Shimojo, Kanagawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 617 days.

(21) Appl. No.: 09/660,459

(22) Filed: Sep. 12, 2000

(30) Foreign Application Priority Data

Sep. 20, 1999 (JP) .......................................... P11-265210

(51) Int. Cl.[7] .............................................. H04L 12/56
(52) U.S. Cl. ....................... 370/392; 370/428; 370/471; 370/474
(58) Field of Search ................................. 370/389, 392, 370/419, 428, 429, 465, 466, 471, 474

(56) References Cited

U.S. PATENT DOCUMENTS

| | | | |
|---|---|---|---|
| 4,748,618 A | * | 5/1988 | Brown et al. ................ 370/419 |
| 5,249,292 A | * | 9/1993 | Chiappa ...................... 370/392 |
| 5,544,329 A | * | 8/1996 | Engel et al. ................... 710/6 |
| 5,566,170 A | * | 10/1996 | Bakke et al. ................ 370/392 |
| 5,598,410 A | * | 1/1997 | Stone .......................... 370/469 |
| 5,774,739 A | * | 6/1998 | Angle et al. ................... 712/34 |
| 5,917,821 A | | 6/1999 | Gobuyan et al. |
| 6,141,348 A | * | 10/2000 | Muntz ......................... 370/392 |
| 6,307,860 B1 | * | 10/2001 | Joffe et al. .................... 370/412 |
| 6,347,087 B1 | * | 2/2002 | Ganesh et al. .............. 370/392 |
| 6,463,059 B1 | * | 10/2002 | Movshovich et al. ....... 370/389 |

FOREIGN PATENT DOCUMENTS

| | | |
|---|---|---|
| EP | 0 289 248 A2 | 11/1988 |
| WO | WO 91/15088 A1 | 10/1991 |

* cited by examiner

*Primary Examiner*—Hassan Kizou
*Assistant Examiner*—Dmitry Levitan
(74) *Attorney, Agent, or Firm*—Foley & Lardner LLP

(57) ABSTRACT

A packet processing device is formed by a digest information generation unit configured to extract a plurality of prescribed bit sequences from an input packet, and generate a digest information capable of specifying at least a part of a processing to be applied to the input packet, according to values of the plurality of proscribed bit sequences; and a packet processing unit configured to process the input packet using an Instruction sequence to be applied to the input packet that is obtained according to the digest information generated by the digest information generation unit, where the digest information generation unit generates the digest information with respect to a next input packet while the packet processing unit carries out a processing for one packet.

6 Claims, 11 Drawing Sheets

- MICRO INSTRUCTION SEQUENCE FOR UDP
- MICRO INSTRUCTION SEQUENCE FOR TCP SYN/FIN
- MICRO INSTRUCTION SEQUENCE FOR ICMP
- MICRO INSTRUCTION SEQUENCE FOR GENERAL PACKET

FAST AND ADAPTIVE PACKET PROCESSING DEVICE AND METHOD USING DIGEST INFORMATION OF INPUT PACKET

BACKGROUND OF THE INVENTION

1. Field of the Invention

The present invention relates to a packet processing device and a packet processing method for carrying out packet processing.

2. Description of the Background Art

In recent years, in conjunction with the drastic increase of traffic on the Internet, there are increasing demands for a device capable of realizing fast processing of packets that transfer information on the Internet. The packet processing is realized by referring to a header portion of a packet entered from the external, and carrying out a desired processing according to information described in that header portion.

Here, the desired processing can be any of the various processings including the following, for example.

(1) A processing for transferring a packet to a specific output link by referring to a destination address contained in the header portion of the packet.

(2) A processing for controlling a packet transfer timing at each output link by referring to priority level information or information indicating attributes of an application that is:carrying out communications using the packet, that is contained in the header portion of this packet, such that the transfer of this packet is paused when a packet with a higher priority level is transferred to an output link to which this packet is to be transferred, for example.

(3) A processing for dividing the packet according to a prescribed method in the case where its packet length exceeds the maximum packet length permitted at a specific output port.

(4) A processing for incrementing a specific information on the packet and discarding the packet when this specific information reaches to a prescribed value.

(5) A processing for rewriting a value of a destination address or a source address according to a prescribed method, according to the need.

(6) A processing for calculating error correction codes of the packet, according to the need.

Historically speaking, a device for processing packets has been realized by an information processing device such as a mini-computer or a micro-processor. In this case, the specific processing to be carried out for each packet as described above is realized by executing a specific instruction sequence at the mini-computer or the micro-processor. However, in this scheme it has been difficult to realize the fast packet processing. For this reason, it is customary in recent years to realize the fast packet processing by implementing the packet processing using hardware.

However, the Internet protocol has a characteristic of being changed continually. For example, the destination address and the source address in the packet have not been subjected to rewriting inside the Internet until a few years ago, but as a resolution to the shortage of the IP addresses due to the Internet boom of the recent years, it has become customary in last two or three years to rewrite the destination address or the source address inside the Internet.

As such, the Internet is operated in such a way that whenever a problem arises while operating the network, a protocol is changed to resolve that problem. As a result, the Internet protocol will continue to change. Consequently, the above described scheme for realizing the fast packet processing by implementing the protocol processing using hardware has a problem in that it becomes impossible to carry out the processing by that hardware even when there are only minor changes in the protocol, and therefore it becomes necessary to replace the packet processing device very frequently.

Also, there have been various propositions for schemes to realize functions required for the packet processing, such as a processing for analyzing the destination address in the header of the IP packet, for example, but in view of different advantages of different function realization schemes, each function realization method has its preferred area for its application. However, the prior art packet processing device has not been provided with a way to select an appropriate scheme from these plurality of function realization schemes easily, and only one particular scheme selected from the various packet processing schemes has been implemented in the prior art packet processing device. As a result, it has been impossible to select the optimum scheme depending on the network environment such as a mixture rate of different packet types, for example, so that it has been impossible to carry out the packet processing efficiently.

As described, the prior art packet processing device has been associated with the problems including: (1) that it is difficult to realize the fast processing when the device is realized by executing a specific instruction sequence at the mini-computer or the micro-processor; (2) that it cannot deal with the protocol change flexibly when the device is realized by implementing the packet processing using hardware; and (3) that it cannot select an optimum function realization scheme depending on the network environment.

SUMMARY OF THE INVENTION

It is therefore an object of the present invention to provide a packet processing device and a packet processing method capable of realizing a fast packet processing, a high adaptability with respect to the protocol change, and an ability to select an optimum function realization scheme according to the network environment.

According to one aspect of the present invention there is provided a packet processing device, comprising: a digest information generation unit configured to extract a plurality of prescribed bit sequences from an input packet, and generate a digest information capable of specifying at least a part of a processing to be applied to the input packet, according to values of the plurality of prescribed bit sequences; and a packet processing unit configured to process the input packet using an instruction sequence to be applied to the input packet that is obtained according to the digest information generated by the digest information generation unit; wherein the digest information generation unit generates the digest information with respect to a next input packet while the packet processing unit carries out a processing for one packet.

According to another aspect of the present invention there is provided a packet processing method, comprising the steps of: (a) extracting a plurality of prescribed bit sequences from an input packet, and generating a digest information capable of specifying at least a part-of a processing to be applied to the input packet, according to values of the plurality of prescribed bit sequences; and (b) processing the input packet using an instruction sequence to be applied to the input packet that is obtained according to the digest information generated by the step (a); wherein the step (a) generates the digest information with respect to a next input packet while the step (b) carries out a processing for one packet.

Other features and advantages of the present invention will become apparent from the following description taken in conjunction with the accompanying drawings.

BRIEF DESCRIPTION OF THE DRAWINGS

FIG. 10 is a diagram showing an exemplary configuration of a micro instruction sequence table in the packet processing device of FIG. 9.

DETAILED DESCRIPTION OF THE PREFERRED EMBODIMENTS

Referring now to FIG. 1 to FIG. 8, the first embodiment of a packet processing device and a packet processing method according to the present invention will be described in detail.

Figure 1:
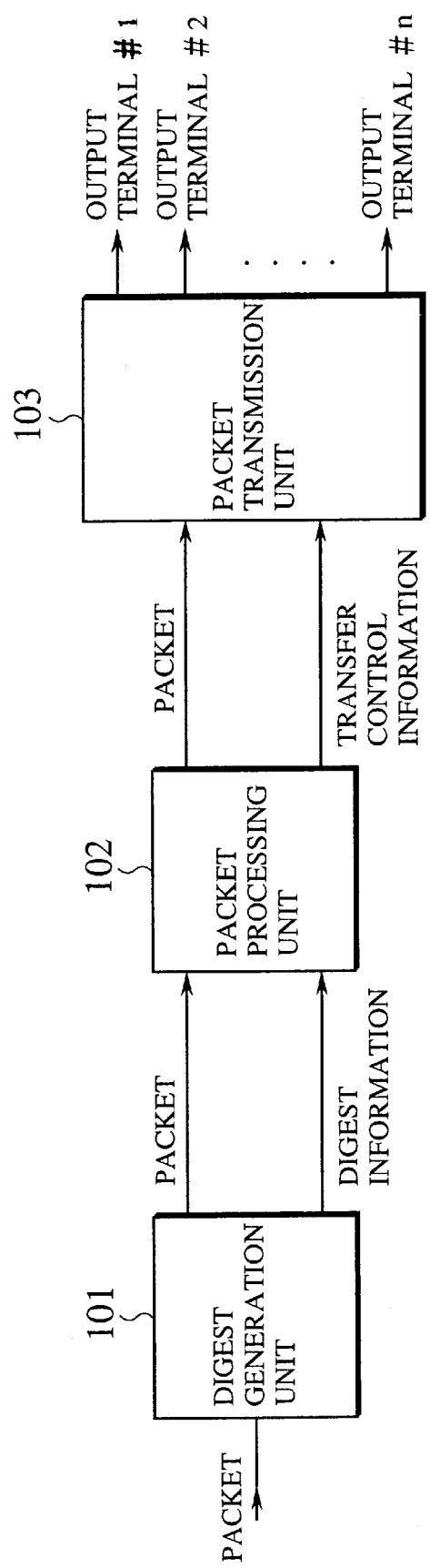
FIG. 1 is a block diagram showing one exemplary configuration of a packet processing device according to the first embodiment of the present invention.

FIG. 1 shows an exemplary configuration of a packet processing device (or message processing device) according to the first embodiment of the present invention.

As shown in FIG. 1, the packet processing device of the first embodiment comprises a digest generation unit 101, a packet processing unit (packet forwarder) 102, and a packet transmission unit 103.

A packet that arrived at this packet processing device is first entered into the digest generation unit 101.

The digest generation unit 101 refers to a header portion of the entered packet, extracts a prescribed plurality of bit sequences (where a bit sequence may contain only 1 bit) from the header portion, and carries out a processing for generating a digest information of that packet by applying, a pattern matching, logical calculations, etc., to the extracted plurality of bit sequences.

Here, the "bit sequence" stands for a part or a whole of a field inside the packet header that is defined by the protocol specification, for example.

As described above, the digest information is information indicating a packet type which is obtained by referring to a prescribed position in the header portion of each packet, and to be specific, can be given in any of the following four types, for example:

(1) IPv4 packet of Ethernet frame, UDP (User Datagram Protocol);

(2) IPv4 packet of Ethernet frame, TCP SYN/FIN (Transmission Control Protocol Synchronize/Finish) message;

(3) IPv4 packet of Ethernet frame, ICMP (Internet Control Message Protocol) message; and (4) Others.

Note that the digest information can be 2 bits data when the digest information is given in four types.

It is of course also possible to consider various other detail configurations for the digest information to be generated by the digest generation unit 101 besides those described above. For example, it is also possible to configure the digest information according to a classification of the entered Ethernet frame or IP packet as that for broadcast, multicast, or unicast, or a classification of the transport protocol presupposed in the entered IP packet as UDP or TCP. However, in the following the case where the digest information is given in the above described four types will be described for the sake of simplicity.

Note also that it is also possible for the digest information to include information produced from the destination address of a packet for the purpose of selecting an optimum search algorithm for a routing table, or information indicating a priority order of a packet for the purpose of providing QoS (Quality of Service), besides information indicating a packet type as described in this embodiment. Such various modifications regarding the digest information will be described in further detail below.

Also, in the following, the above described four types of the digest information will be indicated by "00", "01", "10", and "11", respectively, by way of example.

Now, when the digest information is generated, the digest generation unit 101 transfers this digest information along with the corresponding packet to the packet processing unit 102.

The packet processing unit 102 processes and outputs this packet by using the digest information that is provided along with the packet.

For example, when the digest information is "00", this packet is processed by activating a UDP processing routine that is provided in advance (or by generating and activating a UDP processing routine at this point). The case where the digest information is "01" or "10" is handled similarly. When the digest information is "11", it is a packet classified as "others", so that the packet is processed while classifying the packet types as conventionally done, by activating a general packet processing routing.

Also, the packet processing unit 102 carries out a processing for generating and outputting transfer control information including information specifying an output terminal (output interface) to which this packet should be outputted and information specifying a priority level for transmitting this packet, in the above described processing (or in the processing that is activated separately from the above described processing). The packet with the transfer control information attached thereto is then entered into the packet transmission unit 103.

The packet transmission unit 103 carries out a processing for outputting the entered packet by selecting a specific output terminal according to the transfer control information attached to this packet.

Figure 2:
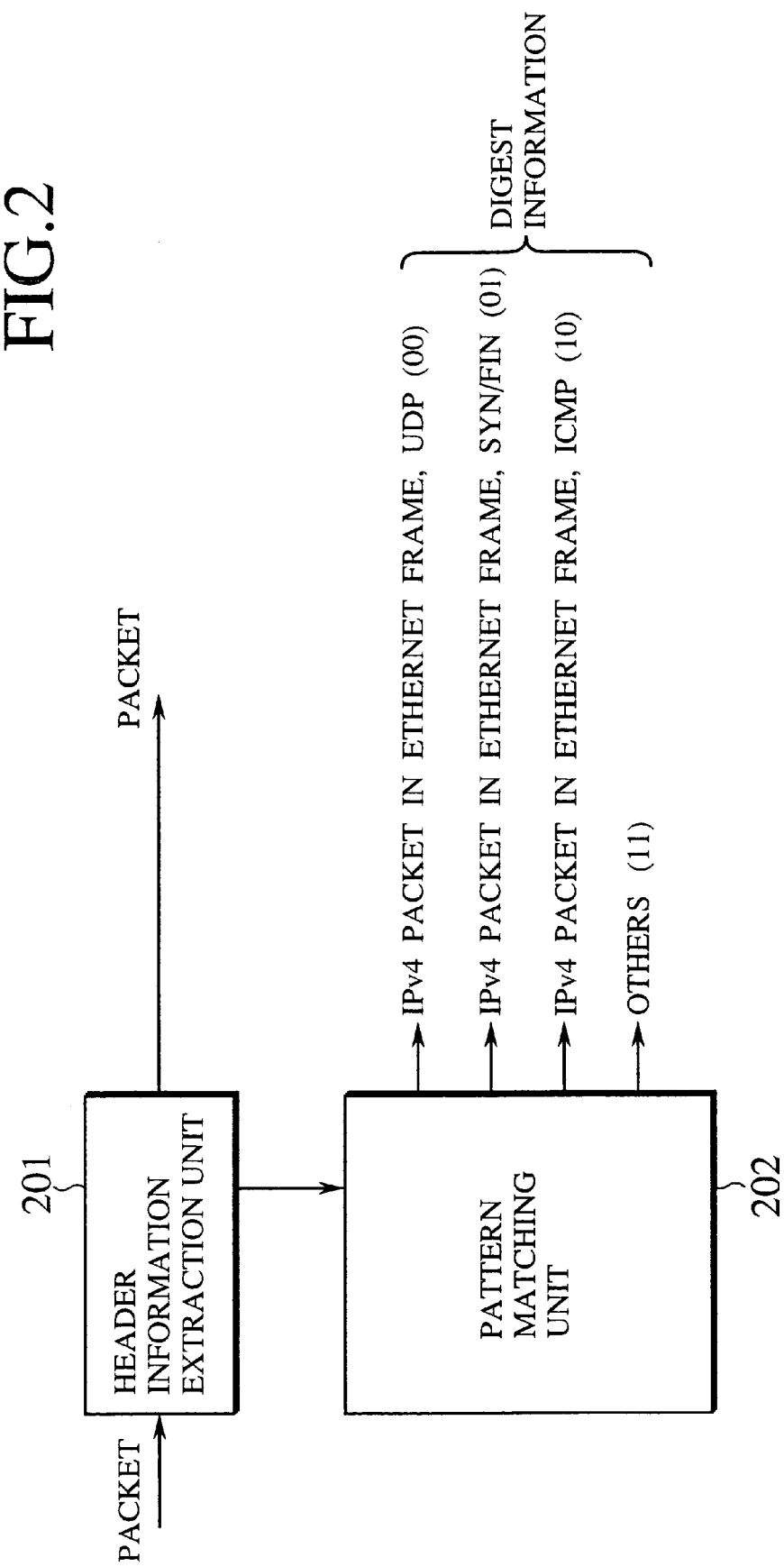
FIG. 2 is a block diagram showing an exemplary configuration of a digest generation unit in the packet processing device of FIG. 1.

FIG. 2 shows an, exemplary configuration of the digest generation unit 101.

This digest generation unit 101 comprises a header information extraction unit 201 for extracting prescribed sections in the header portion of the entered packet, and a pattern matching unit 202 for generating the digest information by judging whether the information extracted by the header information extraction unit 201 is in a prescribed bit pattern or not.

Figure 3:
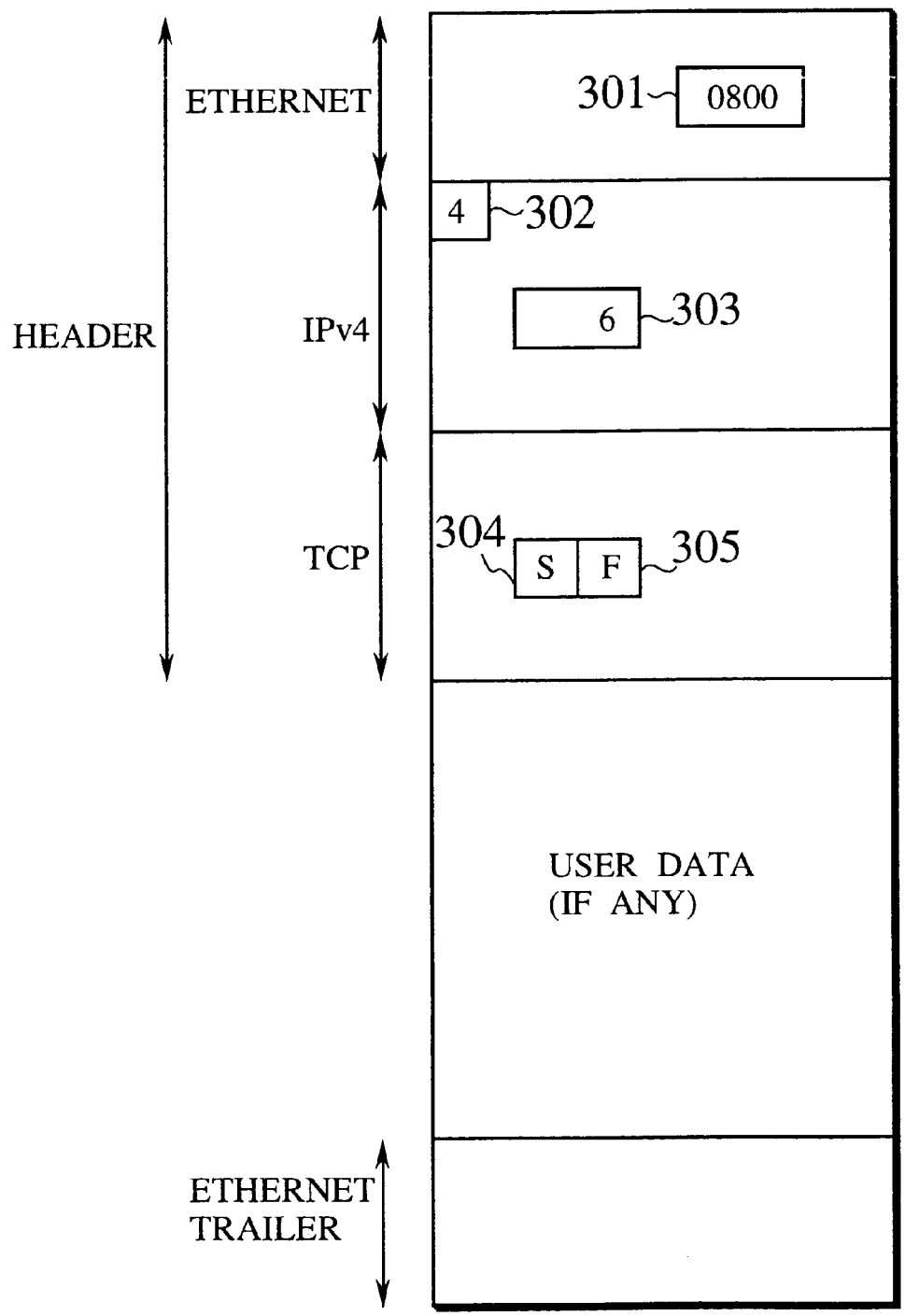
FIG. 3 is a diagram showing exemplary fields to be extracted by a header information extraction unit in in the digest generation unit of FIG. 2.

In the concrete example used in this embodiment, the header information extraction unit 201 extracts the sections as shown in FIG. 3, that is, the following sections:

a protocol type field (301) in the Ethernet header;
a version field (302) in the IP header;
a protocol field (303) in the IP header;
a SYN flag (304) in the TCP header; and
a FIN flag (305) in the TCP header.

The pattern matching unit 202 judges a type of the digest information to be outputted from the above described four types by checking the values of these extracted fields.

For example, it is judged as a TCP SYN/FIN message if the protocol type field in the Ethernet header has a value "0800", the version field in the IP header has a value "4", the protocol type field in the IP header has a value "6", and the SYN flag or the FIN flag in the TCP header is ON.

Note that the digest information is obtained by carrying out the pattern matching at the pattern matching unit 202 in the exemplary configuration of FIG. 2, but instead of that, it is also possible to obtain the digest information by carrying out logical calculations for outputting the digest information using the bit pattern given from the header information extraction unit 201 as an input.

Note also that, in the digest generation unit 101, the plurality of bit sequences to be extracted and the bit pattern used in the pattern matching in the case of using the pattern matching or the content of the logical calculations in the case of using the logical calculations should preferably be changeable from the external. In this way, it becomes possible to deal with the protocol specification change flexibly and to optimize the digest information according to a mixture rate of the packet types in the environment to which this packet processing device is applied, by changing the detailed configuration of the digest information.

Figure 4:
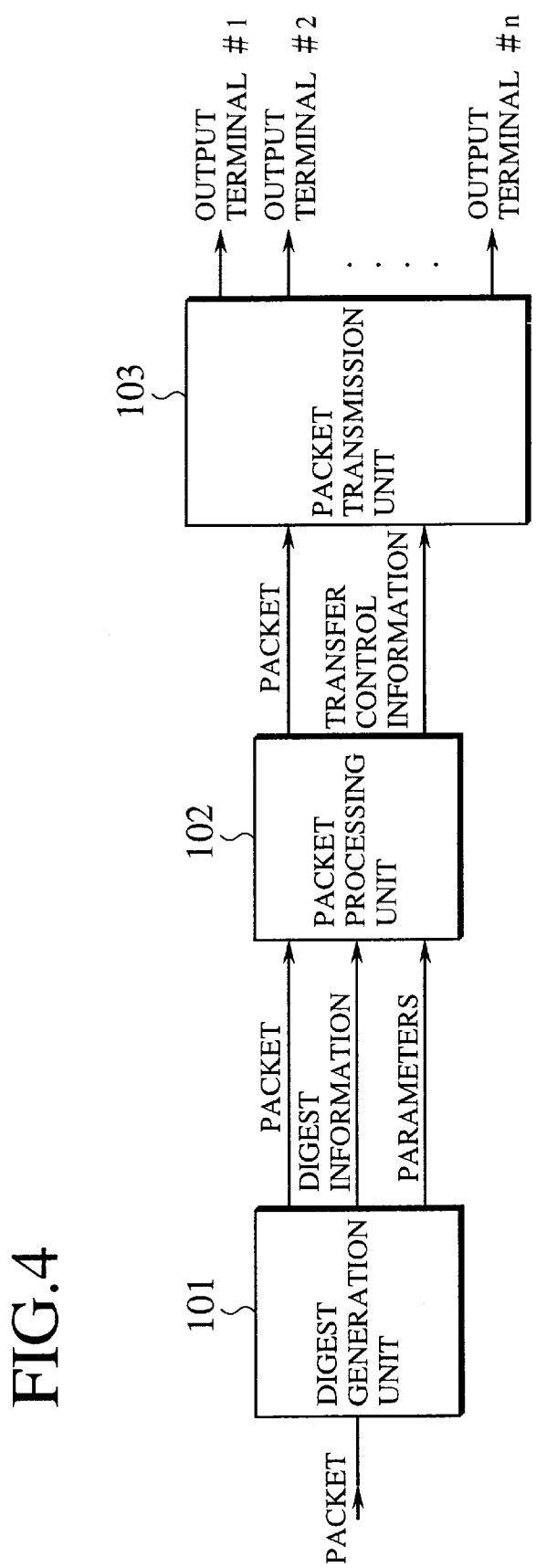
FIG. 4 is a block diagram showing another exemplary configuration of a packet processing device according to the first embodiment of the present invention.

Also, as shown in FIG. 4, it is possible for the digest generation unit 101 to give a prescribed information extracted from the input packet (or an information obtained by processing such a prescribed information) as additional information (parameters) to the packet processing unit 102 along with the digest information. By utilizing the received parameters, the packet processing unit 102 can realize fast processing.

Figure 5:
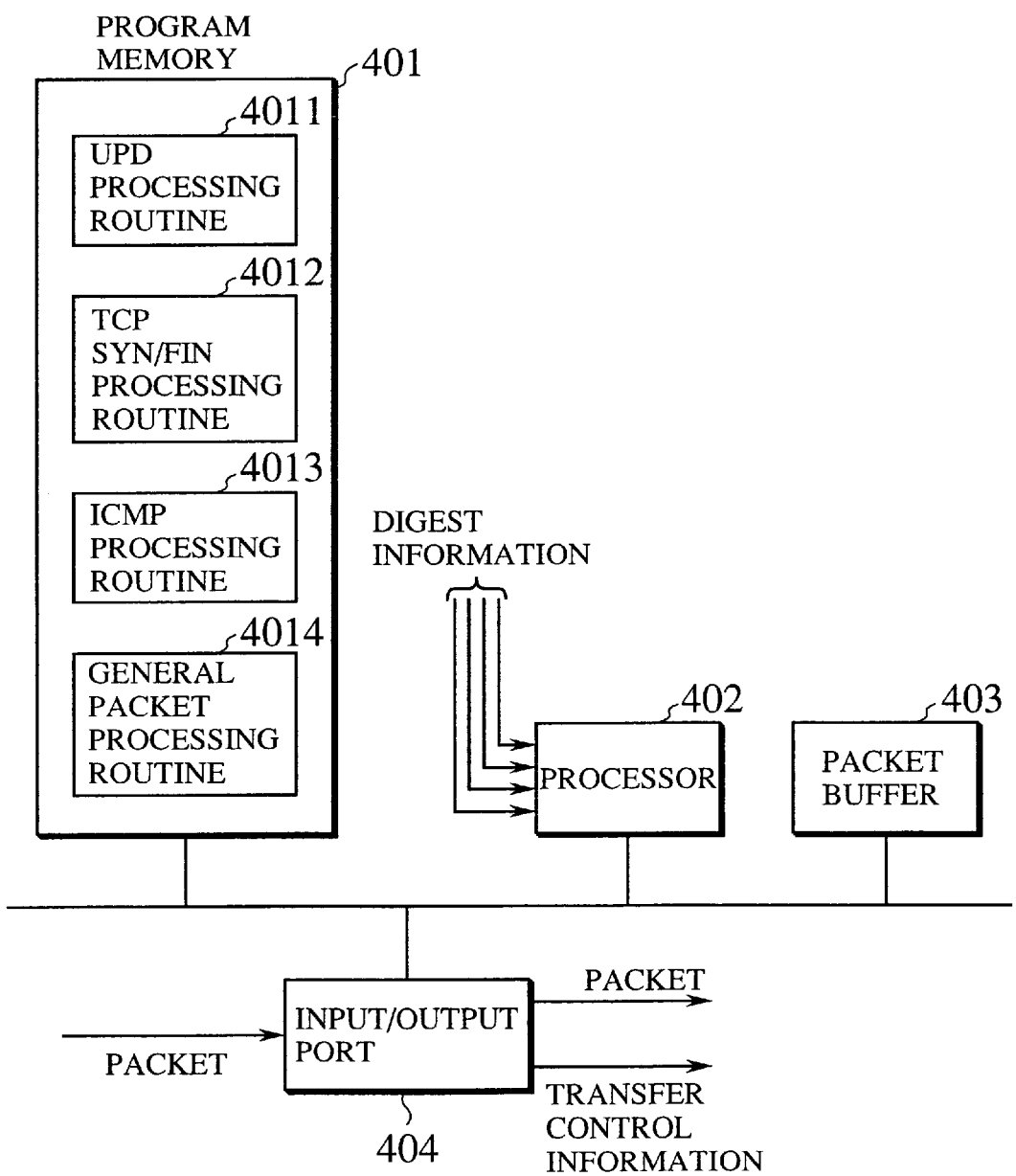
FIG. 5 is a block diagram showing an exemplary configuration of a packet processing unit in the packet processing device of FIG. 1.

FIG. 5 shows an exemplary configuration of the packet processing unit 102.

This packet processing unit 102 has a program memory 401, a processor 402, a packet buffer 403 and an input/output port 404.

The program memory 401 stores the processing routines corresponding to the different types of the digest information.

In the case of the concrete example used in this embodiment, the program memory 401 stores the following:

(1) a UDP processing routine (4011);
(2) a TCP SYN/FIN processing routine (4012);
(3) an ICMP processing routine (4013); and
(4) a general packet processing routine (4014); in correspondence to:
(1) IPv4 packet of Ethernet frame, UDP;
(2) IPv4 packet of Ethernet frame, TCP SYN/FIN message;
(3) IPv4 packet of Ethernet frame, ICMP message; and
(4) Others.

A packet entered from the digest generation unit 101 is written into the packet buffer 403. The digest information given along with this packet is given to the processor 402 as an interruption signal. The processor 402 activates the corresponding processing routing according to the digest information, processes this packet, and outputs this packet to the packet transmission unit 103 along with the transfer control information, through the input/output port 404.

Note that it is also possible to provide (non-executable) programs from which the executable processing routines can be generated, and generate the executable processing routine from the corresponding program at the time of receiving the digest information, rather than providing the executable processing routines in advance. This can be realized, for example, by embedding bit sequences generated according to the additional information shown in FIG. 4, at prescribed portions of the programs from which the executable processing routines can be generated that are maintained as binary data.

Here, the attributes of each packet are distinguished by the digest generation unit 101 in advance and the processing routine in accordance with these attributes is activated so that it is possible to reduce the number of branches inside the processing routine compared with the case of executing the general packet processing routine for all packets. Consequently, it is possible to reduce disturbances to the pipeline inside the processor and to apply the optimization to the processing routine according to these attributes, so that it is possible to improve the throughput of the packet processing device.

In the following, several variations of a more detailed exemplary configuration will be described.

First, the case of executing the digest generation unit 101 and the packet processing unit 102 independently will be described.

As described above, the conventional way of processing packets while classifying the packet types has a problem that it involves many branches and it is time consuming. For this reason, in this embodiment, the branches related to the classification of types are made by the digest generation unit 101, and a processing for obtaining the output route from the destination of the packet or the like is carried out at the packet processing unit 102.

It is preferable to operate the digest generation unit 101 and the packet processing unit 102 independently. To this end, there is a need to connect them through packet queues, for example. In the case of the implementation using LSI (Large Scale Integrated Circuit), it is preferable to adopt a configuration that requires a less amount of memory and a less number of accesses to that memory. For this reason, a configuration as shown in FIG. 6 can be used as a modification of the configuration shown in FIG. 1.

Figure 6:
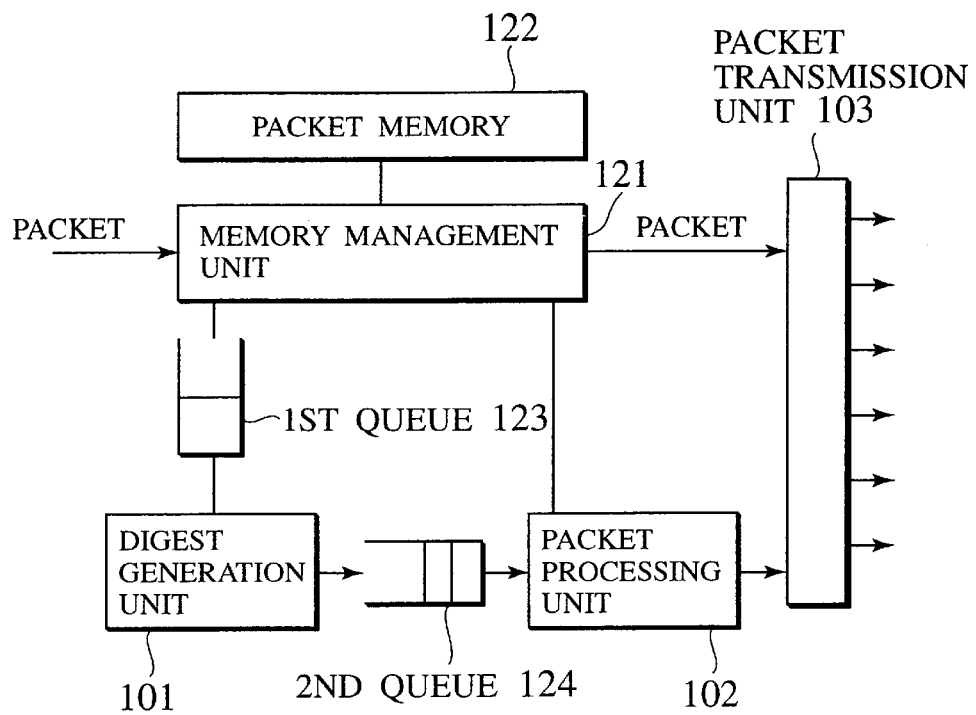
FIG. 6 is a block diagram showing another exemplary configuration of a packet processing device according to the first embodiment of the present invention.

In the configuration of FIG. 6, a packet entered from the external is stored into a packet memory 122 under a control of a memory management unit 121. Then, a memory address at which the packet is stored and an information indicating a state of an input interface are inserted as a single entry into a first queue 123.

The digest generation unit 101 takes out from the first queue 123 an entry that contains the memory address storing the packet to be processed, obtains necessary information by accessing the packet memory 122 via the memory management unit 121, and carries out the digest generation.

The generated digest information is inserted along with a memory address of the packet and the input interface state information as a single entry into a second queue 124.

The packet processing unit 102 takes out from the second queue 124 an entry that contains the packet to be processed, and carries out the processing according to the digest information. At this point, the processing is applied to the packet on the packet memory 122 according to the need. Thereafter, an address storing the packet to which the processing is applied and information specifying the output interface are transferred to the packet transmission unit 103. The packet transmission unit 103 transfers the specified packet to the specified output terminal according to these information.

With this configuration, it becomes possible for the digest generation unit 101 and the packet processing unit 102 to carry out their respective processings with respect to mutually different packets so that the pipeline parallel operations can be realized while reducing the required amount of memory. Also, even when the processing times of the digest generation unit 101 and the packet processing unit 102 are different for different packets, it is possible to absorb the processing time jitter by securing a sufficient length for the second queue 124.

Next, a configuration shown in FIG. 7 and its operation will be described as a further modification of the above described exemplary configuration.

Figure 7:
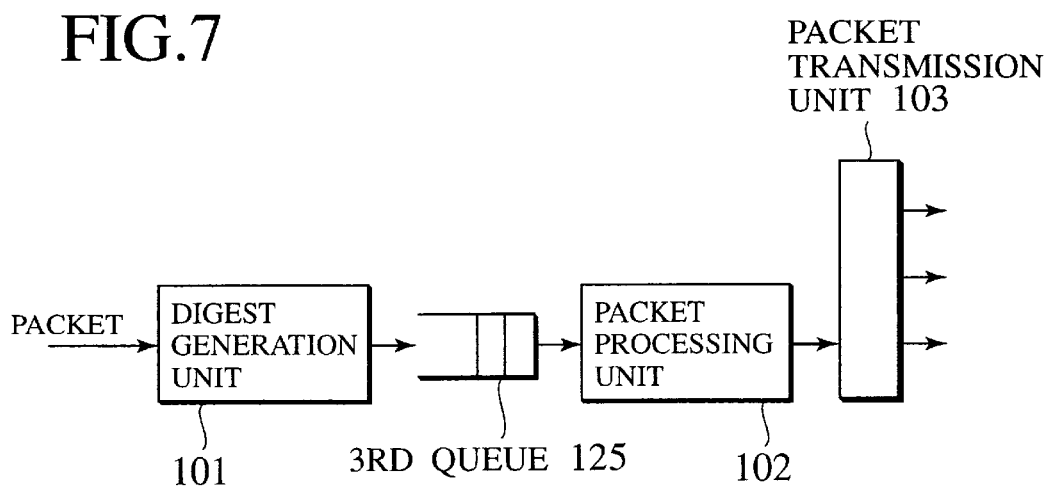
FIG. 7 is a block diagram showing another exemplary configuration of a packet processing device according to the first embodiment of the present invention.

In the configuration of FIG. 7, a packet is entered from the external into the digest generation unit 101 along with information indicating the state of an input interface. The digest generation unit 101 carries out the digest generation immediately and inserts the generated digest information along with the packet and the input interface state information as a single entry into a third queue 125.

The packet processing unit 102 takes out a packet entered into the third queue 125, applies the processing to the packet according to the attached digest information, and outputs this packet along with information specifying the output terminal to which this packet should be outputted, to the packet transmission unit 103. The packet transmission unit 103 transfers this packet to the specified output terminal according to these information.

In this case, the digest generation unit 101 carries out the digest generation without referring to the packet memory 122, and this has an advantage in that conflicts of accesses to the packet memory 122 by the digest generation unit 101 and the packet processing unit 102 can be reduced. It is also possible to incorporate functions that are part of functions of the input interface into the digest generation unit 101. An example of such a case includes that for handling bit streams as represented by the frame synchronization at the link layer and the CRC calculation.

Next, an exemplary configuration for realizing the interruption at a time of the packet arrival by a more detailed operation of the packet processing unit 102 shown in FIG. 5 will be described. In the case of realizing the interruption processing, there are technical issues including how to prohibit an admission of the interruption.

In this case, the processor 402 has two sets of registers for storing the digest information. One is for storing the digest information corresponding to the currently processed packet, and the other is for storing the digest information corresponding to a packet in the pending state. The former will be referred to as a processing register and the latter will be referred to as a pending register.

When the digest information arrives at the processor 402, this digest information is stored into the pending register first. When the digest information arrives at the pending register, an interruption number is generated from the digest information, and the interruption to the processor 402 is attempted.

When the interruption is admitted at the processor 402, control is transferred to the packet processing program which is the interruption handling routine. At the same time, the digest information is transferred to the processing register. If there is a queue between the packet processing unit 102 and the digest generation unit 101, the digest information queued in this queue will be advanced, and the top will be transferred to the pending register.

The processor 402 is in the interruption disabled state while executing the packet processing program. By executing an interruption enable command at the timing of completion of the packet processing, the processing of the next digest information will be started.

The digest information generation and the packet processing routine configuration are described above for an exemplary case of classification according to a difference in the processing to be applied to the packet, but the classification other than that according to a difference in the processing is also possible.

Various modifications of the digest information will now be described.

For example, even in the case of carrying out the same processing, plural ways for realizing this processing may exist. In the packet processing unit 102, a search through a database (not shown) using a specific field of the header of the packet as a key will be carried out frequently. Suppose that there are plural algorithms for the database search, and that an amount of calculations or delay of the search is different depending on a type of the key and a distribution of that key on the database. This is a case that is often encountered in the database search for determining an output terminal (output interface) using a network address as a key.

Assume now that there are four search algorithms, and the search key is given by a 32 bits field. Further assume that this 32 bits space is to be divided into 128 equal parts, and the most efficient search algorithm on average can be determined for each part. This operation is determined according to characteristics of the database and to be carried out off-line separately from the real time processing of the packet processing. As a result, a correspondence between the upper 7 bits of 32 bits and 2 bits identifier for specifying the search algorithm is determined. It is also possible to make the digest information to contain the identifier for specifying the search algorithm as well and the digest generation unit 101 to generate the information for specifying the search algorithm from the upper 7 bits of 32 bits network address as described above. Such a digest information can be generated by a table look-up realized by a semiconductor memory or by some logical calculations.

Note also that a plurality of bit sequences used in the digest generation are extracted from the header of the packet at the digest generation unit 101, and such bit sequences are often also required to be extracted again at the packet processing unit 102. The bit sequence extraction is normally associated with shift calculations or mask calculations, and once these operations are done in the digest generation unit 101 there is no need to carry out these operations again in the packet processing unit 102. The extracted information can be notified as a part of the digest information directly to the packet processing unit 102 to omit the unnecessary repetition. In this way, the processing load of the packet processing unit 102 can be reduced and read requests with respect to the packet buffer can be reduced so that the throughput can be improved.

Next, the case of giving the parameters along with the digest information from the digest generation unit 101 to the packet processing unit 102 will be described.

At the digest generation unit 101, prescribed one or a plurality of bit sequences may be extracted separately from the extraction of a plurality of bit sequences for the sake of the digest information, and any of: (1) that prescribed one or a plurality of bit sequences; (2) that prescribed one or a plurality of bit sequences with data of a part of a whole of the plurality of bit sequences extracted for the sake of the digest information added; (3) data obtained by processing data of the above (1); (4) data obtained by processing data of the above (2); (5) a part or a whole of the plurality of bit sequences extracted for the sake of the digest information, or (6) data obtained by processing data of the above (5), may be given as the parameters to the packet processing unit 102. Note that it is also possible to use the entire packet header as additional information.

The parameters produced in a process of generating the digest information can be effectively utilized at the packet processing unit 102 as well (although such parameters should preferably be used in a manner that does not cause any side effect).

For example, consider the case where a search through a database (not shown) using a value of some field as a key is to be carried out at the packet processing unit 102, and a hash calculation using a part or a whole of the same field is to be carried out at a time of generating the digest information. In this case, it is possible to reduce the total number of keys to be targets of the search by dividing the keys of the database into a direct product of smaller databases by classifying them according to that hash function, so that it is possible to realize a faster processing in the case where the search algorithm requires an amount of calculations proportional to the total number of keys.

It is also possible to consider the packet processing unit 102 configured as follows.

In the packet processing unit 102, frequently used data are often stored temporarily in a fast cache memory in order to realize a fast database search. In this case, the cache hit rate becomes higher and a contribution to a fast realization becomes greater when a correlation between data on the cache and data required in the search operation with respect to a packet that actually arrived is higher.

As a method for increasing the possibility for having highly correlated data on the cache, a method known as prefetch operation is often used. This is an operation in which a read from a main memory to the cache is made speculatively, by reading in advance those data which have higher possibilities of being referred to in near future. This is done only when there is no side effect due to the reading of these data, and it does not matter whether the data read into the cache will be actually used or not.

In order for this prefetch operation to be effective, the time from prefetch to use should be sufficiently longer than the delay due to reading from the main memory to the cache. In other words, there is a need to carry out the prefetch operation sufficiently in advance.

However, it is difficult to realize a sufficiently long delay time to make the prefetch operation effective if the prefetch is carried out by extracting fields of the packet and obtaining an address of the database according to them only after the packet has arrived.

In view of this, it is possible to adopt a digest generation method in Which the bit sequences to be extracted at the digest generation unit 101 are the bit sequences that include portions to be keys for the database search and values to be used as addresses for the memory accesses of the database search can be obtained as an intermediate result of the digest generation. More specifically, it is possible to adopt a scheme in which a hash table is to be used as the database search algorithm and the digest information is generated by using the same hash function that is used on that hash table as described above.

In this case, addresses to be used in accesses to the hash table are already calculated as an intermediate result of the calculations related to the digest generation, so that these addresses are notified as the parameters attached to the digest information to the packet processing unit 102. At the packet processing unit 102, the prefetch operation is carried out using values of the received parameters as addresses of the databases as soon as the packet processing routine is activated. In this way, it becomes possible to carry out the prefetch operation at the earliest possible stage in the packet processing so that a greater effect for hiding the delay can be realized.

Alternatively, it is also possible to speculatively execute the database search by regarding values of the received parameters as memory addresses of the database search at a timing where the digest information is notified to the packet processing unit 102. In this case, the time until activating the packet processing routine will also hide the delay in the prefetch so that it is possible to expect an even greater effect of the prefetch.

As a further modification of the digest information, it is also possible to include a priority control information of a packet in the digest information as follows.

First, a combination of a priority control information of a packet and a protocol identifier for specifying an upper level protocol of a packet will be considered. Here, a packet processing method largely differs depending on a way in which each of them is specified. It is inefficient to realize both of them by a single program as already mentioned above.

Here, if the priority control information is 8 bits and the upper level protocol specification is 8 bits, a straightforward combination would be 16 bits. It is also possible to provide an optimized program for each one of them.

It is also possible to handle similar types of processings collectively. For example, the processing with considerably fewer programs than the straightforward combination can be realized by handling all the protocols that require the same processing by a single program.

The 8 bits priority control information is converted into a 3 bits identifier according to a classification of similar types of processings, for example, and the 8 bits protocol number is converted into a 2 bits identifier according to a classification of similar types of processings. The 3 bits identifier and the 2 bits identifier so obtained are converted into an identifier of 5 bits or so by applying some logical calculation (which may be a simple concatenation). This will then be used as the digest information. The packet processing unit 102 activates the packet processing routine to be activated according to this digest information. In the example described here, one of the 32 types of the packet processing routines may be selected. Each of these packet processing routines contains a processing related to the priority control that is specified by the 3 bits identifier.

Now, the number of bits to be used as the digest information is finite. For example, it is impossible to generate classified types in excess of the storage capacity of the packet processing routines (4011 to 4014 of FIG. 5). There is also a limitation due to the bit width of a communication path between the digest generation unit 101 and the packet processing unit 102. On the other hand, more classified types of packets would imply that the digest generation unit 100 can make a more detailed packet type judgement so that the packet processing routine can be more specialized and the processing performance of the packet processing unit 102 can be improved.

Consequently, it is preferable to set the bit length of the digest information to be generated by the digest generation unit 101 as long as possible on one hand, but it is preferable to set the number of the digest information to be simultaneously handled by the packet processing unit 102 as small as possible one the other hand. In the following, a method for satisfying both of these requirements will be described.

At the digest generation unit 101, an information given by a large number of bits is generated as a virtual digest information. The packet processing routines are provided in correspondence to such virtual digest information.

Figure 8:
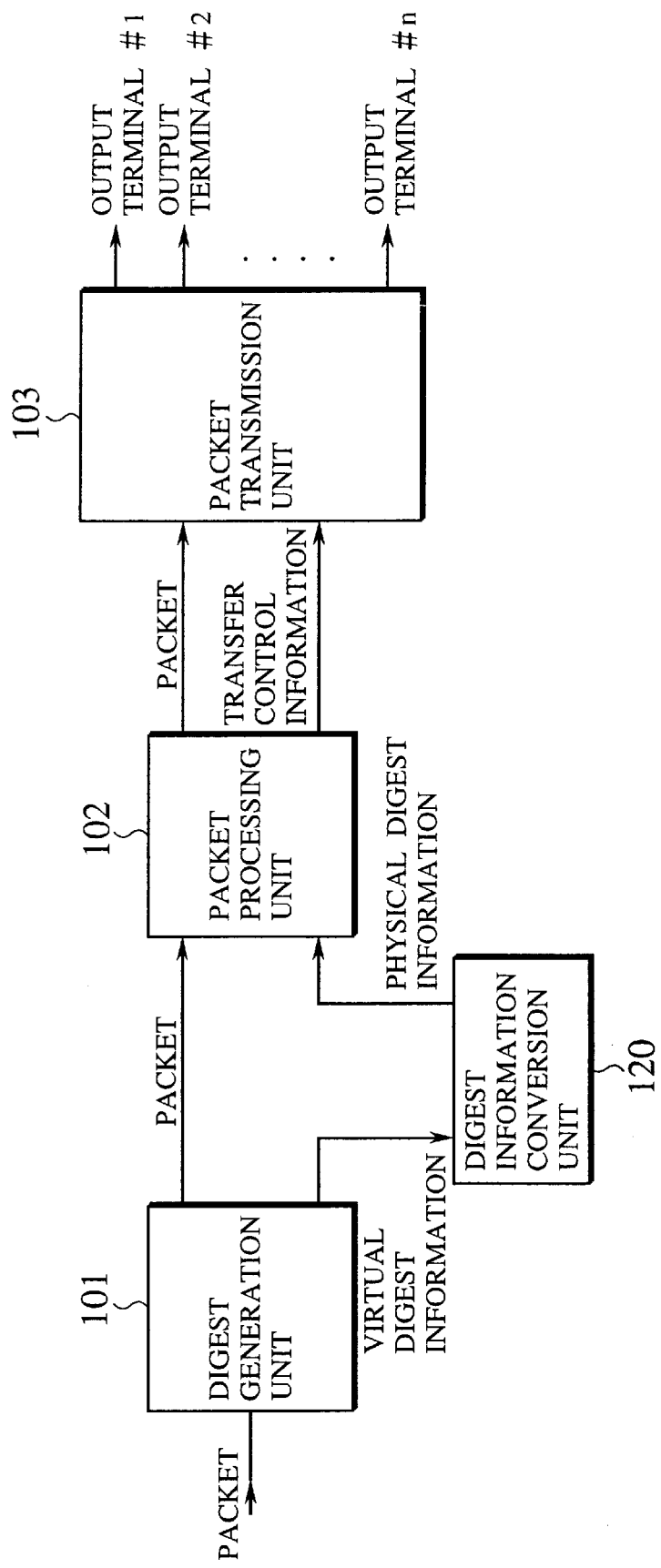
FIG. 8 is a block diagram showing another exemplary configuration of a packet processing device according to the first embodiment of the present invention.

As shown in FIG. 8, at an interface connecting between the digest generation unit 101 and the packet processing unit 102, a digest information conversion unit 120 for converting the virtual digest information into a physical digest information given by a number of bits that can actually be notified to the packet processing unit 102 is provided. The digest information to be sent to the packet processing unit 102 can be generated by converting the virtual digest information into the physical digest information using this digest information conversion unit 120.

When the correspondence between the virtual digest information and the physical digest information is determined by the control function of the digest information conversion unit 120, this correspondence is reflected into a conversion table inside the digest information conversion unit 120 by a conversion table writing function, and the packet processing routine corresponding to the classified type of the virtual digest information is stored into the program memory of the packet processing unit 102 as the packet processing routine corresponding to the physical digest information.

The virtual digest information has a longer bit length than the physical digest information so that there are some virtual digest information that cannot be allocated to any specific physical digest information. A physical digest information representing "others" is allocated to these virtual digest information, and a general processing routine for processing without assuming any packet type classification is allocated as the packet processing routine corresponding to the physical digest information representing "others", and stored into the program memory.

The processing performance of the general processing routine is inferior to the processing performance of the specialized processing routine so that it is preferable to suppress the frequency to activate the general processing routine to the minimum. For this reason, the conversion table control function should find out such a correspondence between the virtual digest information and the physical digest information that makes a frequency of selecting "others" as low as possible under the environment in which this packet processing device is placed, and reflect such a correspondence into the conversion table.

As a more effective way of generating the conversion table, it is also possible to use the following configuration.

In the conversion table for conversion from the virtual digest information to the physical digest information, a counter for counting the number of times for which the input virtual digest information is entered can be provided for each virtual digest information.

The conversion table control function can obtain the frequency of occurrences of each virtual digest information according to individual counter value, and allocate the physical digest information to the virtual digest information with a higher frequency of occurrences.

More specifically, it is possible to adopt the following procedure.

As an initial state, the physical digest information representing "others" is allocated to all the virtual digest information. After operating the packet processing device in that state to such an extent that a significant measurement of a frequency of occurrences of the virtual digest information is conducted, the correspondence between the virtual digest information and the physical digest information is determined and reflected into the conversion table. Even after that, the measurement of the frequency of occurrences is continued, and when it is Judged that a significant difference from the correspondences obtained earlier is discernible, the conversion table and the packet processing routine are replaced by those reflecting the new correspondences.

Referring now to FIG. 9 to FIG. 13, the second embodiment of a packet processing device and a packet processing method according to the present invention will be described in detail.

Figure 9:
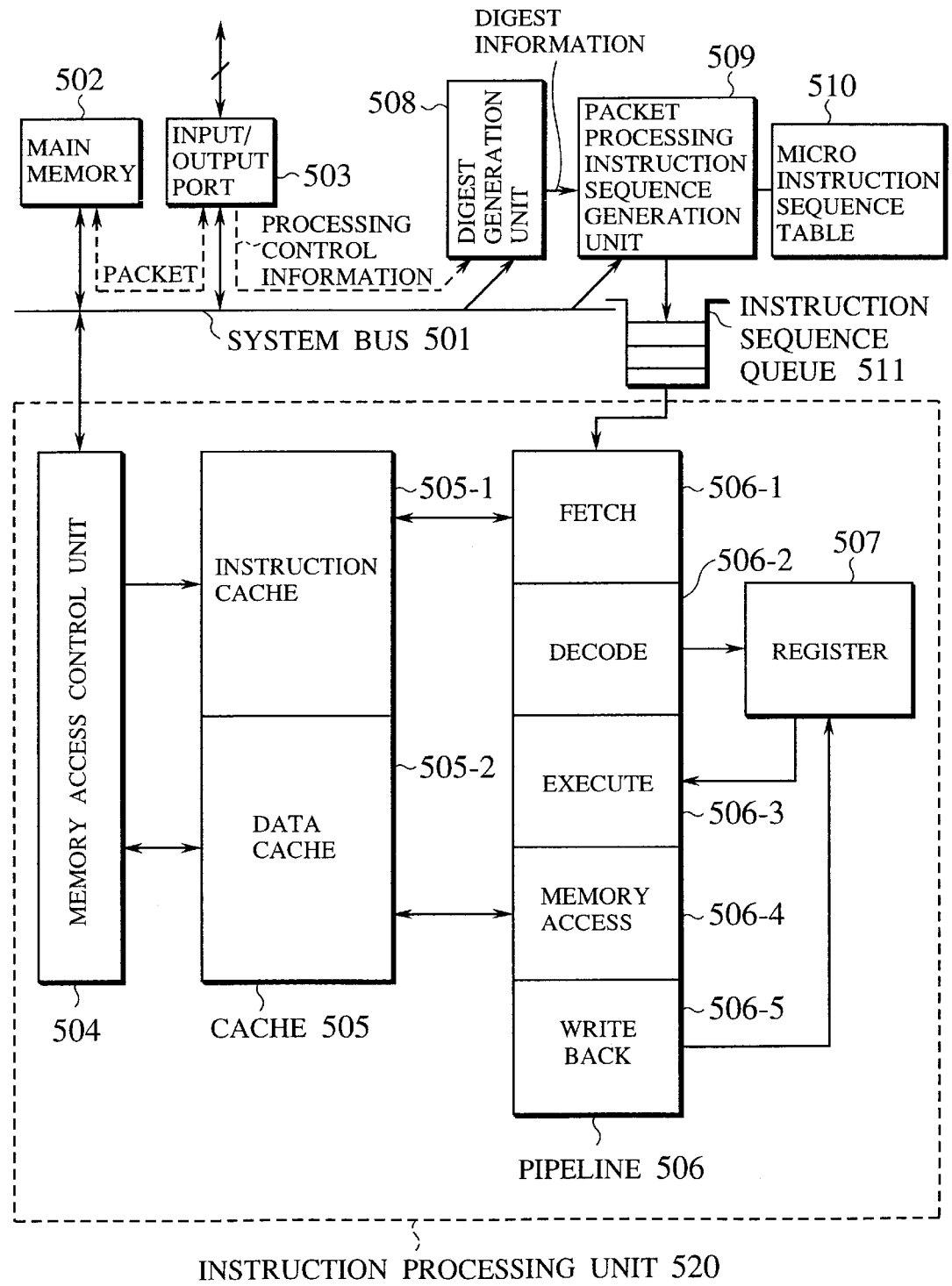
FIG. 9 is a block diagram showing one exemplary configuration of a packet processing device according to the second embodiment of the present invention.

FIG. 9 shows an exemplary configuration of a packet processing device (or message processing device) according to the second embodiment of the present invention.

As shown in FIG. 9, the packet processing device of the second embodiment comprises a system bus 501, a main memory 502, an input/output port 503, a memory access control unit 504, a cache 505, a pipeline 506, a register 507, a digest generation unit 508, a packet processing instruction sequence generation unit 509, a micro instruction sequence table 510, and an instruction sequence queue 511.

Here, the memory access control unit 504, the cache 505, the pipeline 506, and the register 507 constitute an instruction processing unit 520 for interpreting and executing instruction sequences contained in the main memory 502 and applying processings specified by these instruction sequences to data.

Note here that the cache 505 is separated into an instruction cache 505-1 for caching a part of instruction sequences and a data cache 505-2 for caching a part of data to which the processings are to be applied.

Also, there can be many possible configurations of the pipeline 506 for executing instructions, but it is assumed to be a well known pipeline having five stages of the fetch 506-1, decode 506-2, execute 506-3, memory access 506-4 and write back 506-5.

The main memory 502 for storing instruction sequences indicating information processing procedures and data to be processed, the input/output port 503 which is a hardware for inputting/outputting data with respect to the external, the digest generation unit 508, the packet processing instruction sequence generation unit 509 and the instruction processing unit 520 are connected by a system bus 501.

The basic configuration and operation of this second embodiment are similar to those of the first embodiment (the description of variations also equally applies), so that features specific to the configuration of FIG. 9 will be mainly described in the following.

The digest generation unit 508 is similar to that of the first embodiment, which receives the header portion of the packet entered from the external and generates the digest information. It may also generate additional information (parameters) as in the first embodiment.

The packet processing instruction generation unit 509 has a function of receiving the digest information from the digest generation unit 508, generating an instruction sequence for the purpose of processing this packet according to a procedure described below, and giving it to the instruction sequence queue 511. The instruction sequence to be generated here will be generated by referring to the content of the micro instruction sequence table 510.

The packet arrived from the external is stored into a prescribed region in the main memory 502 via the input/output port 503 and the system bus 501.

After that, prescribed sections (a plurality of bit sequences), such as a header of the datalink layer, a header of the network layer and a header of the transport layer for example, are extracted and given to the digest generation unit 508. This processing may be executed by the instruction sequence stored in the main memory 502. Hereafter these prescribed sections will be referred to as processing control information for the sake of explanation. Also, this processing control information may contain information indicating a position at which the packet is stored in the main memory 502.

Upon receiving the processing control information from the input/output port 503, the digest generation unit 508 generates the digest information from that information.

Upon receiving the digest information from the digest generation unit 508, the packet processing instruction sequence generation unit 509 generates the instruction sequence.

Here, the micro instruction sequence table 510 holds executable instruction sequences (sequences of micro instructions) for the purpose of realizing the processings according to the respective packet types, as shown in FIG. 10. The packet processing instruction sequence generation unit 509 reads out the instruction sequence according to the generated digest information from the micro instruction sequence table 510, and stores it into the instruction sequence queue 511.

On the other hand, the instruction processing unit 520 reads out the instruction sequence from the main memory 502 to the instruction cache 505-1 according to a program counter (not shown) provided therein, and sequentially executes this instruction sequence by using the pipeline 506.

At this point, each stage of the pipeline 506 plays the following respectively assigned roles.

The fetch 506-1 fetches an instruction from the instruction cache 505-1.

The decode 506-2 decodes this instruction and determines a subsequent pipeline and operation content of the register 507.

The execute 506-3 applies processing to data given from the register 507 according to a command of the decode 506-2.

The memory access 506-4 either writes data given from the execute 506-3 through the data cache 505-2 or gives it to the next stage.

The write back 506-5 writes back data given from the memory access 506-4 to the register 507.

In the case of this packet processing device, there are instruction sequences to be processed not only on the main memory 502 but also on the instruction sequence queue 511, so that the fetch 506-1 fetches instructions alternately from the instruction sequences on the main memory 502 and the instruction sequence queue 511 and give the fetched instructions to the subsequent stages, whenever a prescribed condition such as that the instruction sequence queue 511 is not empty holds. In this way, the instruction sequence generated by the packet processing instruction sequence generation unit 509 will be executed, and thereby desired processing is carried out with respect to the entered packet.

In this case of executing a plurality of independent instruction sequences (that is, the instruction sequence from the main memory 502 and the instruction sequence from the instruction queue 511) alternately in this manner, the register may be allocated exclusively to each instruction sequence. In this way, the stopping of the pipeline 506 due to the register hazard can be prevented.

In the second embodiment, the instruction sequence for each processing routine corresponding to the digest information is contained in the micro instruction sequence table 510, but this micro instruction sequence table 510 may be formed by a rewritable memory medium such that the table can be reconfigured by rewriting respective processing routines according to the need. In this way, it becomes possible to deal with the change in detailed parts of of the protocol specification flexibly. In this case, it is also possible to adopt a configuration in which the micro instruction sequence table 510 is connected to the system bus 501 such that the micro instruction sequence table 510 can be rewritten by executing the instruction sequence on the main memory 502.

Also, in the second embodiment, the instruction sequence for the purpose of the protocol processing generated by the packet processing instruction sequence generation unit 509 and the instruction sequence read out from the main memory 502 according to the program counter (not shown) of the instruction processing unit 520 can easily share (data storage regions of) the main memory 502. For this reason, it is also possible to easily realize a monitoring control of the protocol processing operation executed by the instruction sequence from the packet processing instruction sequence generation unit 509 by an application on an operating system executed by the instruction sequence on the main memory 502, for example.

Now, the digest information may contain not Just information for selecting the packet processing routine but also information regarding the packet itself. In such a case, the packet processing instruction sequence generation unit 509 can generate an efficient instruction sequence by using the digest information rather than simply entering the instructions from the instruction table into the pipeline. A configuration in such a case will now be described.

Figure 11:
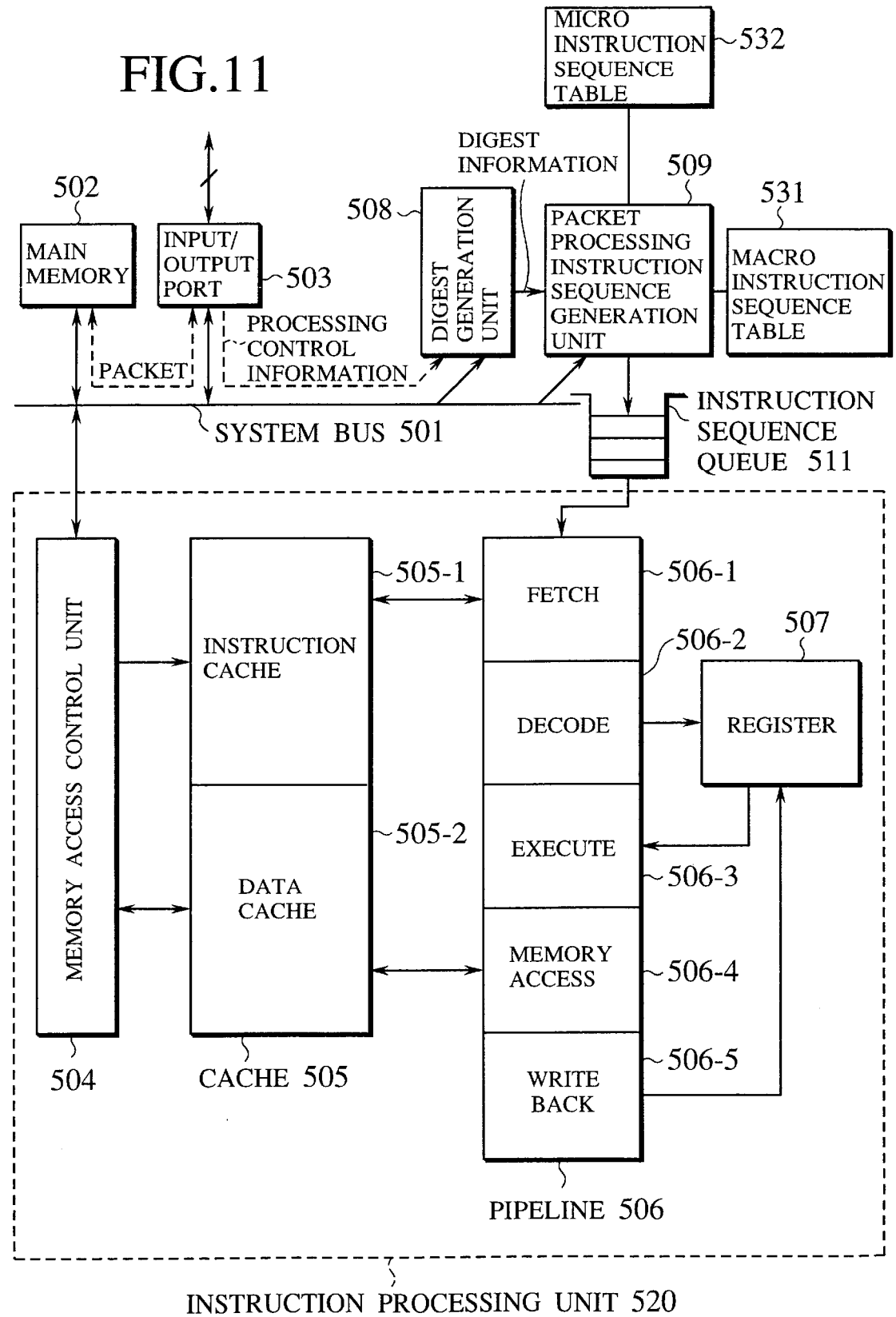
FIG. 11 is a block diagram showing another exemplary configuration of a packet processing device according to the second embodiment of the present invention.
Figure 12:
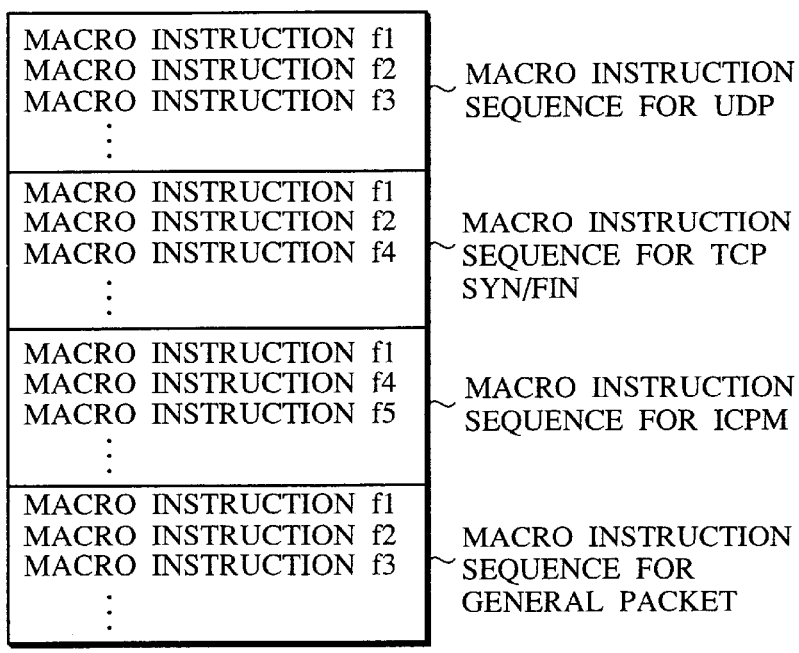
FIG. 12 is a diagram showing an exemplary configuration of a macro instruction sequence table in the packet processing device of FIG. 11.
Figure 13:
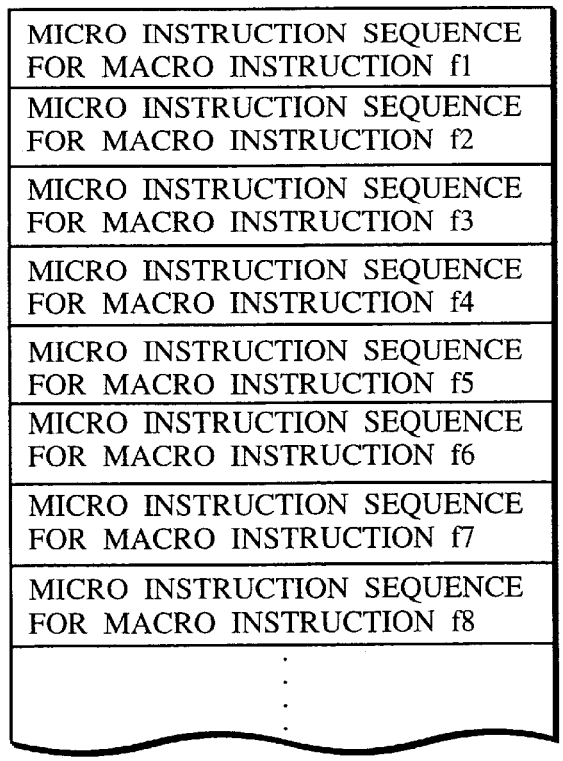
FIG. 13 is a diagram showing an exemplary configuration of a micro instruction sequence table in the packet processing device of FIG. 11.

FIG. 11 shows an exemplary configuration of the packet processing device for such a case. In the following, differences from the configuration of FIG. 9 will be mainly described.

The processing routines to be carried out with respect to the packet include many common operations. For example, an operation for reading out the bit sequence from the header and rewriting it in the packet header processing, and an operation of hashing and key matching in a multiple memory indirect addressing or a linked list traversal, content addressable memory access as accesses with respect to the routing table, are basic operations that are commonly used in the packet processing. These operations can be realized by micro instruction sequences, and a macro instruction that encodes the micro instruction sequences as a single instruction can be defined. Then, the packet processing routines are stored as macro instruction sequences in a macro instruction sequence table 531 of FIG. 11 in a form shown in FIG. 12, while the micro instruction sequences for each macro instruction are stored in a micro instruction sequence table 532 of FIG. 11 in a form shown in FIG. 13.

After receiving the digest information from the digest generation unit 508, the packet processing instruction sequence generation unit 509 reads out a macro instruction sequence corresponding to the digest information from the macro instruction sequence table 531, reads out the corresponding micro instruction sequences for each macro instruction of that macro instruction sequence from the micro instruction sequence table 532, and writes them into the instruction sequence queue 511.

The packet processing is carried out by executing these micro instruction sequences in the pipeline 506 of the instruction processing unit 520.

In generating the micro instruction sequences at the packet processing instruction sequence generation unit 509, instead of writing the micro instructions read out from the micro instruction sequence table 532 directly into the instruction sequence queue 511, it is also possible to apply the following conversion on the micro instructions before writing into the instruction sequence queue 511 such that shorter, more efficient micro instructions can be executed at the instruction processing unit 520. Namely, when the micro instruction has an operand that refers to the digest information, the digest information can be embedded into the micro instruction as an immediate.

For example, when one digest information D is located at an address A of the data cache 505, the micro instruction sequence for carrying out an addition calculation with respect to another data B can be given by the following instruction sequence.

load R, mem[A]// load from memory, from address A into register R add R, R, B // add R and B into register R Here, by converting the digest information referring into an immediate such that a memory access becomes a register substitution, it is possible to generate the following instruction sequence.

move R, D // move value D into register R add R, R, B // add R and B into register R As another example, when it is possible to specify a number that specifies: embedding of the digest information as an immediate, instead of the register number, in a register number portion of the micro instruction, the above instruction sequence can be expressed as follows.

add R, digest-value, B // add digest value and B into register R

In this case, the packet processing instruction sequence generation unit 509 can convert this instruction sequence by replacing the digest information portion of this instruction sequence with the actual value of the digest information as follows.

add R, D, B // add D and B into register R

Note that, in either one of the first and second embodiments, the the packet type is classified first according to the header portion of the entered packet, and then the instruction sequence for the packet processing is generated according to the classified type, so that the number of conditional branches contained in the instruction sequence of the protocol processing can be reduced. In the prior art, many conditional branchings are involved in the instruction sequence of the protocol processing as the necessary processing is carried out while classifying the packet type by sequentially reading fields of the header portion, so that many pipeline disturbances have occurred, and this was the major hindrance to the realization of the fast protocol processing in the prior art. In this regard, in the present invention, it becomes possible to execute the protocol processing by the instruction sequence with the reduced number of conditional branchings so that the pipeline disturbances can be suppressed to the minimum and it becomes possible to realize the protocol processing that takes the full advantage of the pipeline performance.

As described, according to the present invention, one digest information capable of specifying at least a part of the processing to be applied to the input packet is generated from the input packet, and the input packet is processed by using the instruction sequence to be applied to the input packet that is obtained according to this generated digest information, so that it becomes possible to realize the fast packer processing, and it becomes possible to deal with the protocol change flexibly. In addition, by changing the digest information appropriately according to the network environment such as the packet type, it is also possible to realize the protocol processing efficiently.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A packet processing device comprising:
    a digest information generation unit configured to extract a plurality of prescribed bit sequences from an input packet, and generate a digest information capable of specifying at least a part of a processing to be applied to the input packet, according to values of the plurality of prescribed bit sequences; and
    a packet processing unit configured to process the input packet using an instruction sequence to be applied to the input packet that is obtained according to the digest information generated by the digest information generation unit;
    wherein the digest information generation unit generates the digest information with respect to a next input packet while the packet processing unit carries out a processing for one packet; and
    wherein the packet processing unit includes:
        an instruction processing unit configured to carry out a pipeline processing of micro instruction sequences;
        an instruction sequence table configured to store a plurality of macro instruction sequences corresponding to a plurality of digest information; and
        a unit configured to give a micro instruction sequence selected from the instruction sequence table according to the digest information generated by the digest information generation unit, to the instruction processing unit.

2. The packet processing device of claim 1, wherein the instruction processing unit is capable of executing an instruction sequence selected from the instruction sequence table and an instruction sequence written in a main memory for carrying out a processing other than a processing with respect to the input packet, alternately.

3. A packet processing device of claim 1, comprising:
    a digest information generation unit configured to extract a plurality of prescribed bit sequences from an input packet, and generate a digest information capable of specifying at least a part of a processing to be applied to the input packet, according to values of the plurality of prescribed bit sequences and a packet processing unit configured to process the input packet using an instruction sequence to be applied to the input packet that is obtained according to the digest information generated by the digest information generation unit;

wherein the digest information generation unit generates the digest information with respect to a next input packet while the packet processing unit carries out a processing for one packet; and wherein the packet processing unit includes:
- an instruction processing unit configured to carry out a pipeline processing of micro instruction sequences;
- an instruction sequence table configured to store a plurality of macro instruction sequences corresponding to a plurality of digest information;
- a conversion unit configured to convert a macro instruction sequence selected from the instruction sequence table according to the digest information generated by the digest information generation unit, into micro instructions; and
- a unit configured to give the micro instructions obtained by the conversion unit to the instruction processing unit.

4. The packet processing device of claim 3, wherein the instruction processing unit is capable of executing an instruction sequence selected from the instruction sequence table and an instruction sequence written in a main memory for carrying out a processing other than a processing with respect to the input packet, alternately.

5. A packet processing device comprising:

a digest information generation unit configured to extract a plurality of prescribed bit sequences from input packet, and generate a digest information capable of specifying at least a part of a processing to be applied to the input packet, according to values of the plurality of described bit sequences; and a packet processing unit configured to process the input packet using an instruction sequence to be applied to the input packet that is obtained according to the digest information generated by the digest information generation unit;

wherein the digest information generation unit generates the digest information with respect to a next input packet while the packet processing unit carries out a processing for one packet;

wherein the digest information generation unit also extracts parameters for a processing of the input packet from the input packet and gives the parameters along with the digest information to the packet processing unit; and wherein the packet processing unit includes:
- an instruction processing unit configured to carry out a pipeline processing of micro instruction sequences;
- an instruction sequence table configured to store a plurality of macro instruction sequences corresponding to a plurality of digest information;
- a conversion unit configured to convert a macro instruction sequence selected from the instruction sequence table according to the digest information generated by the digest information generation unit, into micro instructions, while accounting for the parameters; and
- a unit configured to give the micro instructions obtained by the conversion unit to the instruction processing unit.

6. The packet processing device of claim 3, wherein the instruction processing unit is capable of executing an instruction sequence selected from the instruction sequence table and an instruction sequence written in a main memory for carrying out a processing other than a processing with respect to the input packet, alternately.

* * * * *